United States Patent
Ishiguchi

(10) Patent No.: US 10,701,338 B2
(45) Date of Patent: Jun. 30, 2020

(54) DISPLAY APPARATUS

(71) Applicant: Mitsubishi Electric Corporation, Tokyo (JP)

(72) Inventor: Kazuhiro Ishiguchi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 24 days.

(21) Appl. No.: 16/034,538

(22) Filed: Jul. 13, 2018

(65) Prior Publication Data
US 2019/0037203 A1  Jan. 31, 2019

(30) Foreign Application Priority Data
Jul. 25, 2017 (JP) ................ 2017-143233

(51) Int. Cl.
| | |
|---|---|
| *H04N 13/225* | (2018.01) |
| *H04N 13/106* | (2018.01) |
| *G06F 3/01* | (2006.01) |
| *H04N 13/239* | (2018.01) |
| *H04N 13/315* | (2018.01) |
| *H04N 13/366* | (2018.01) |
| *H04N 13/398* | (2018.01) |

(52) U.S. Cl.
CPC ........... *H04N 13/225* (2018.05); *G06F 3/012* (2013.01); *H04N 13/158* (2018.05); *H04N 13/239* (2018.05); *H04N 13/315* (2018.05); *H04N 13/366* (2018.05); *H04N 13/398* (2018.05)

(58) Field of Classification Search
CPC .... G06F 3/012; H04N 13/158; H04N 13/225; H04N 13/239; H04N 13/315; H04N 13/366; H04N 13/398

USPC ........................................... 348/156
See application file for complete search history.

(56) References Cited

U.S. PATENT DOCUMENTS

| | | |
|---|---|---|
| 6,970,290 B1 | 11/2005 | Mashitani et al. |
| 8,860,790 B2 | 10/2014 | Ericson et al. |
| 9,485,487 B2 | 11/2016 | Kroon |
| 2006/0252987 A1* | 11/2006 | Hasegawa ...... A61B 1/00009 600/101 |
| 2016/0195731 A1 | 7/2016 | Murao et al. |
| 2016/0198149 A1 | 7/2016 | Yuuki et al. |
| 2017/0024624 A1 | 1/2017 | Bieg |

(Continued)

FOREIGN PATENT DOCUMENTS

| | | |
|---|---|---|
| JP | 03-119889 A | 5/1991 |
| JP | 2857429 B2 | 11/1998 |
| JP | 2001-166259 A | 6/2001 |

(Continued)

*Primary Examiner* — Jamie J Atala
*Assistant Examiner* — Kathleen V Nguyen
(74) *Attorney, Agent, or Firm* — Studebaker & Brackett PC

(57) ABSTRACT

Provided is a technique for enhancing the display quality of a stereoscopic image. A display apparatus includes a parallax barrier, a detector, a predictor, and a controller. The detector detects a position of an observer. The predictor predicts, on the basis of a plurality of positions detected by the detector at past times, the position of the observer at a time coming after the past times, at which the plurality of positions have been detected. The controller determines a parallax barrier pattern selectively switching a plurality of barriers to a light transmissive state, and controls the parallax barrier on the basis of the parallax barrier pattern.

6 Claims, 12 Drawing Sheets

(56) References Cited

U.S. PATENT DOCUMENTS

2017/0032201 A1    2/2017   Bieg
2017/0282068 A1* 10/2017   Pasquier .................. G06F 3/01

FOREIGN PATENT DOCUMENTS

| JP | 2005-092451 A | 4/2005 |
|----|---------------|--------|
| JP | 2010-538344 A | 12/2010 |
| JP | 2014-524181 A | 9/2014 |
| JP | 2017-024711 A | 2/2017 |
| JP | 2017-027604 A | 2/2017 |
| WO | 2009/027691 A1 | 3/2009 |
| WO | 2012/176109 A1 | 12/2012 |
| WO | 2014/181567 A1 | 11/2014 |
| WO | 2015/029433 A1 | 3/2015 |

* cited by examiner

DISPLAY APPARATUS

BACKGROUND OF THE INVENTION

Field of the Invention

The present invention relates to display apparatuses capable of stereoscopically displaying images.

Description of the Background Art

Auto stereoscopic-image display apparatuses have been conventionally proposed that allow observers to see stereoscopic images without wearing special glasses.

For instance, Japanese Patent Application Laid-Open No. 3-119889 discloses a stereoscopic-image display apparatus including the following components: a barrier generating means generating parallax barrier stripes by electronically controlling a transmission display element; and an image display means capable of, when displaying a stereoscopic image, outputting and displaying a multi-directional image consisting of an alternate arrangement of left-image and right-image stripes corresponding to the parallax barrier stripes onto a display screen spaced away backward from a parallax-barrier-stripe generation site by a predetermined distance.

This stereoscopic-image display apparatus electronically generates the barrier stripes and freely controls the shape of the generated barrier stripes (e.g., the number, width, or interval of the stripes), the position (phase) and concentration of the generated barrier stripes, and other features. Thus, such an apparatus achieves compatibility between being a two-dimensional-image display apparatus and being a stereoscopic-image display apparatus.

Japanese Patent Application Laid-Open No. 2001-166259 discloses an auto-stereoscopic-image display apparatus including the following components: an image display means that alternately displays a striped left-eye image and a striped right-eye image; a light-blocking means that moves the position of a light-blocking unit producing a binocular parallax effect at ¼ pitches of the pitch of the light-blocking-unit; a sensor that detects whether a side-to-side positional movement of observer's head and the position of observer's head are or are not beyond a suitable vision range in front and back directions; and a section-dividing and motion-controlling means that divides the light-blocking means into sections in a side-to-side direction, and controls motion and non-motion of the position of the light-blocking unit of the light-blocking means in each section as divided on the basis of a state where the position of the observer's head is beyond the suitable vision range in front and back directions.

In the stereoscopic-image display apparatus in Japanese Patent Application Laid-Open No. 2001-166259, the motion of the light-blocking unit and the display in the image display means are controlled. Hence, the stereoscopic-image display apparatus provides observer's right eye with the right-eye image and observer's left eye with the left-eye image even when the observer's head moves to where somewhat deviates from a suitable vision position. This allows the observer to identify a stereoscopic image.

Japanese Patent Application Laid-Open No. 2005-92451 discloses a technique for providing a stereoscopic image suitable for an observer position by detecting the observer position with a camera and controlling barriers on the basis of the observer position. Japanese Patent Application Laid-Open No. 2017-24711 discloses a technique for estimating a line of sight of the observer even when observer's head or eye is remote from a detection range of a sensor.

Calculation processing of detecting the position of the observer from an image captured by the camera requires a certain time period. Moreover, calculating an optimal position of the barrier stripes from the detected position of the observer and then applying an electrical signal to a parallax barrier on the basis of a calculation result is also time-consuming. Further, an optical response of the barrier as supplied with the electrical signal also requires a time period; in particular, an optical response of the barriers requires a relatively long time period in the use of liquid crystals under low temperature for barrier-stripe generation.

In this way, capturing the image of the observer and then controlling the barriers to achieve optimal barrier stripes require a certain time period due to a delay in its system. For this reason, there is no time for control for achieving the optimal barrier stripes when the observer is moving, thereby degrading the display quality of the stereoscopic image.

SUMMARY

To solve the above problem, it is an object of the present invention to provide a technique for enhancing the display quality of a stereoscopic image.

The present invention is directed to a display apparatus including a display panel, a parallax barrier, a detector, a predictor, and a controller. The parallax barrier in which a plurality of light shutters switchable between a light transmissive state and a light blocking state with respect to light from the display panel are arranged. The detector is configured to detect a position of an observer. The predictor is configured to predict, on the basis of a plurality of positions detected by the detector at past times, the position of the observer at a time coming after the past times, at which the plurality of positions have been detected. The controller is configured to control selective switching of the plurality of light shutters to the light transmissive state on the basis of the position predicted by the predictor.

Such a configuration enhances the display quality of the stereoscopic image.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

<Configuration>

Figure 1:
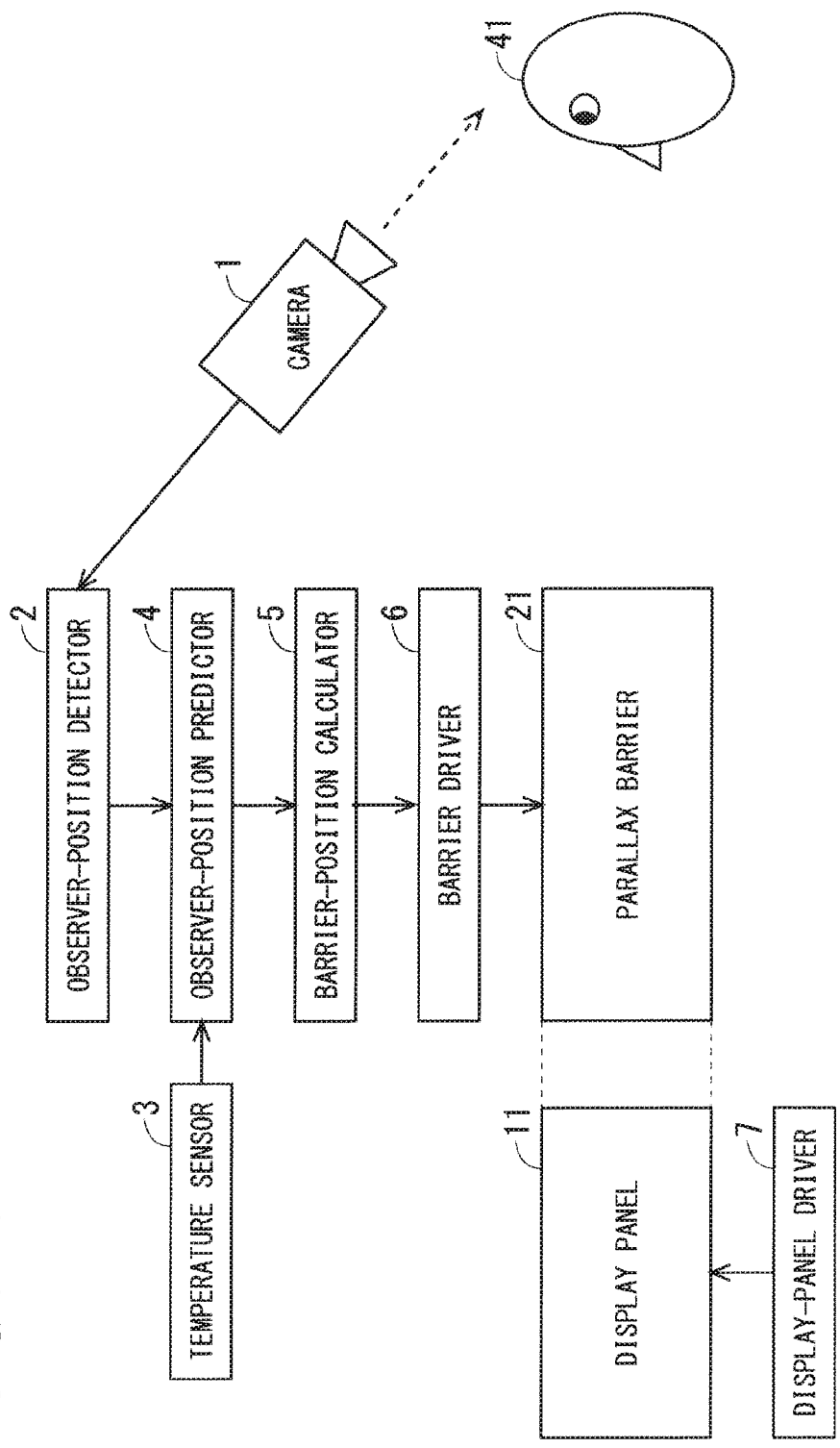
FIG. 1 is a block diagram illustrating a configuration of a display apparatus according to a first preferred embodiment.

FIG. 1 is a block diagram illustrating a configuration of a display apparatus according to a first preferred embodiment of the present invention. The display apparatus in FIG. 1 includes the following components: a camera 1; a detector, which in this embodiment is an observer-position detector 2; a temperature sensor 3; a predictor, which in this embodiment is an observer-position predictor 4; a barrier-position calculator 5; a barrier driver 6; a display-panel driver 7; a display panel 11; and a parallax barrier 21.

The observer-position detector 2 calculates (detects) a position of an observer 41 from an image captured by, for example, a two-lens camera. In the first preferred embodiment, the position of the observer 41 is a two-dimensional position including a horizontal position with respect to a screen consisting of the display panel 11 and the parallax barrier 21, and a perpendicular position corresponding to a distance with respect to the screen. The position of the observer 41 to be calculated may be any position; for instance, the position of the observer 41 may be one of the horizontal position and the perpendicular position, or a three-dimensional position corresponding to horizontal and perpendicular distances.

The temperature sensor 3 detects a temperature of the parallax barrier 21.

The observer-position predictor 4 predicts the position of the observer 41 at a time coming after past times at which a plurality of positions have been detected, on the basis of the plurality of positions detected by the observer-position detector 2 at the past times. In the first preferred embodiment, the time coming after the past times means a future time coming after a current time. The observer-position predictor 4 predicts information about the position of the observer 41 by reflecting the temperature detected by the temperature sensor 3.

The barrier-position calculator 5 calculates an optimal barrier stripe pattern on the basis of the information about the position of the observer 41, which is predicted by the observer-position predictor 4. It is noted that a barrier stripe pattern or parallax barrier pattern will be detailed later on.

The observer-position detector 2, the observer-position predictor 4, and the barrier-position calculator 5 are easily configured by a single microcomputer including an input-and-output unit, a memory, a central processing unit (CPU), and other components. The microcomputer includes an observer-position detection program, an observer-position prediction program, and a barrier-position calculation program.

The barrier driver 6 applies an electrical signal in conformance with the barrier stripe pattern, calculated by the barrier-position calculator 5, to the parallax barrier.

The display-panel driver 7 produces a signal for driving the display panel 11 on the basis of an external input video signal, which is not shown, and then outputs the produced signal to the display panel 11.

The display panel 11 displays a video image using the signal received from the display-panel driver 7. In the first preferred embodiment, the display panel 11 is a liquid crystal panel.

Figure 2:
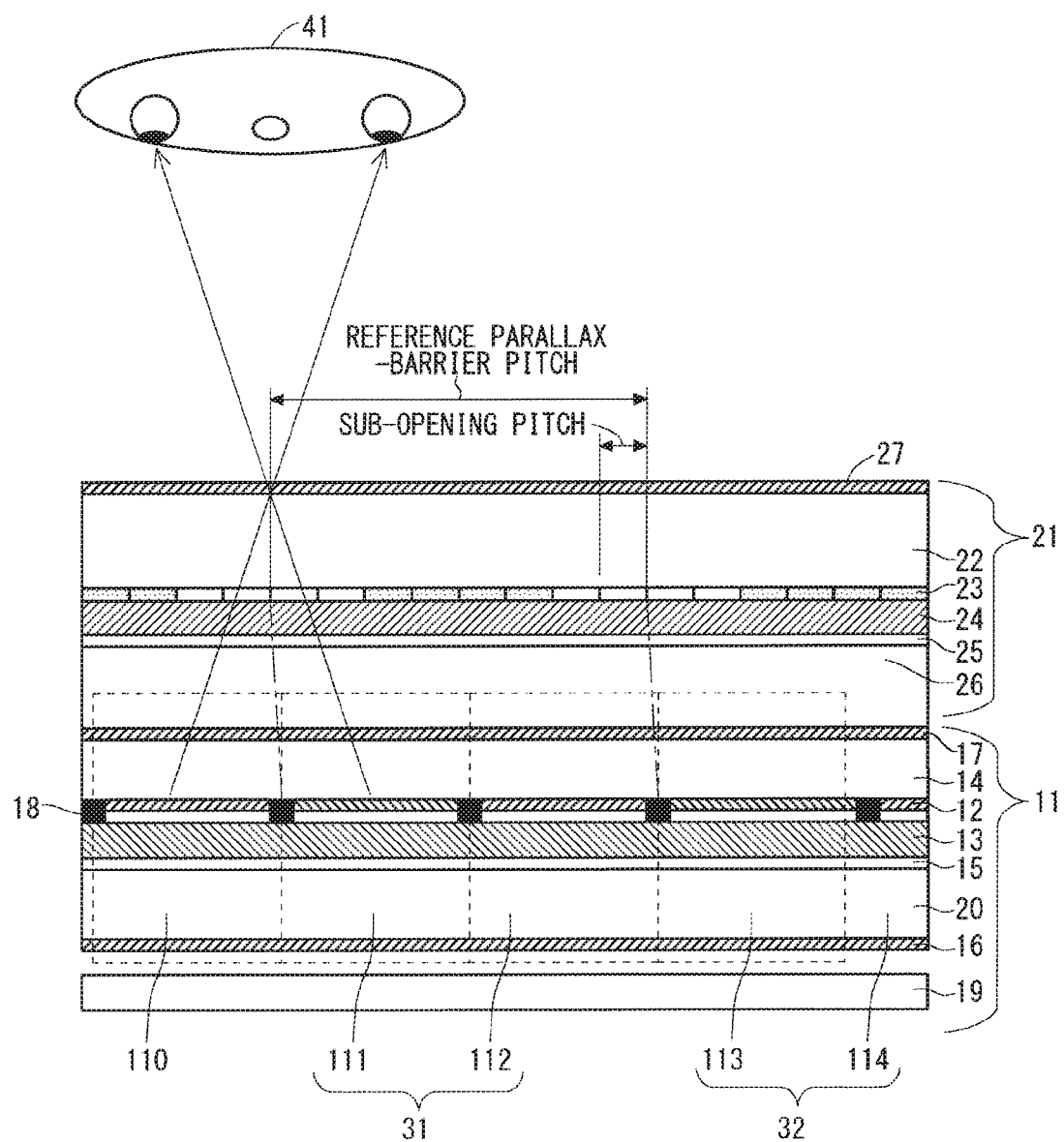
FIG. 2 is a cross-sectional view of a configuration example of a display panel and a parallax barrier.
Figure 3:
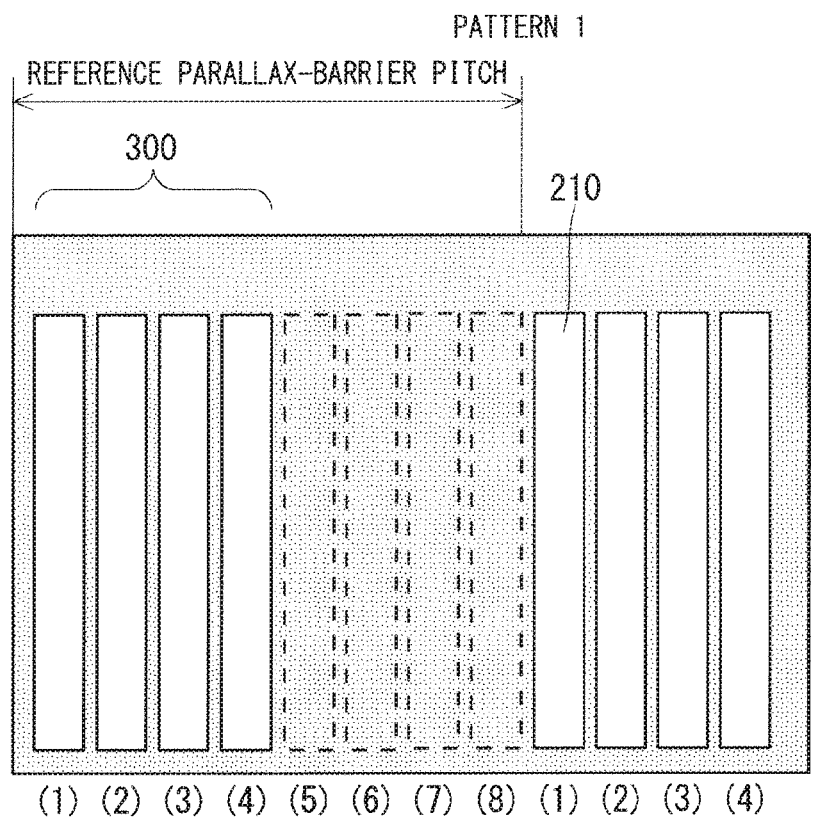
FIGS. 3 to 10 are diagrams each illustrating a parallax barrier pattern according to the first preferred embodiment.
Figure 4:
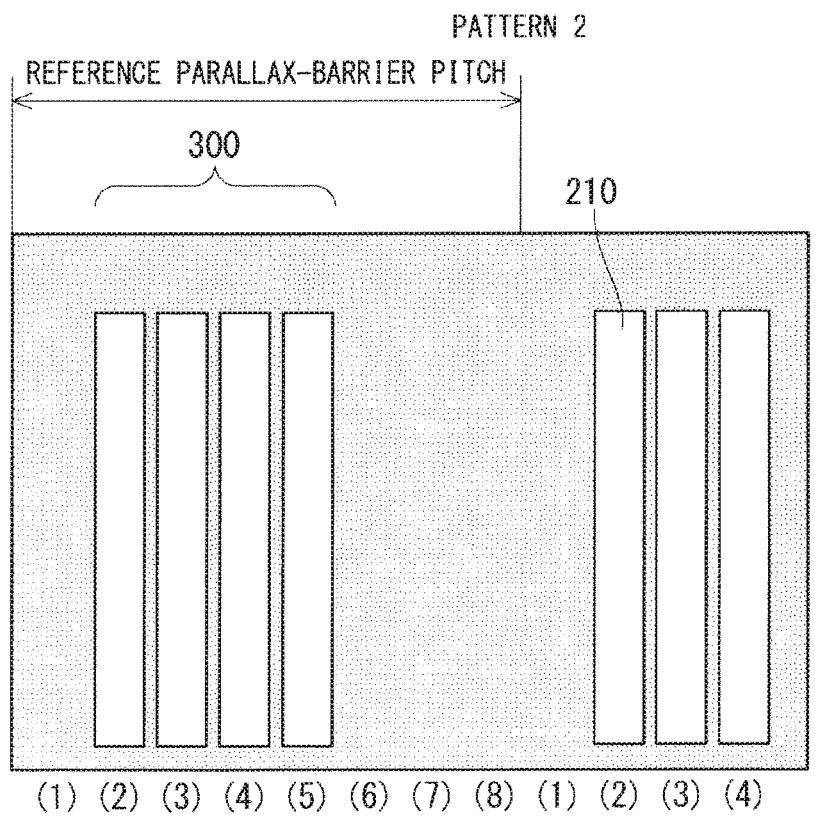
Figure 5:
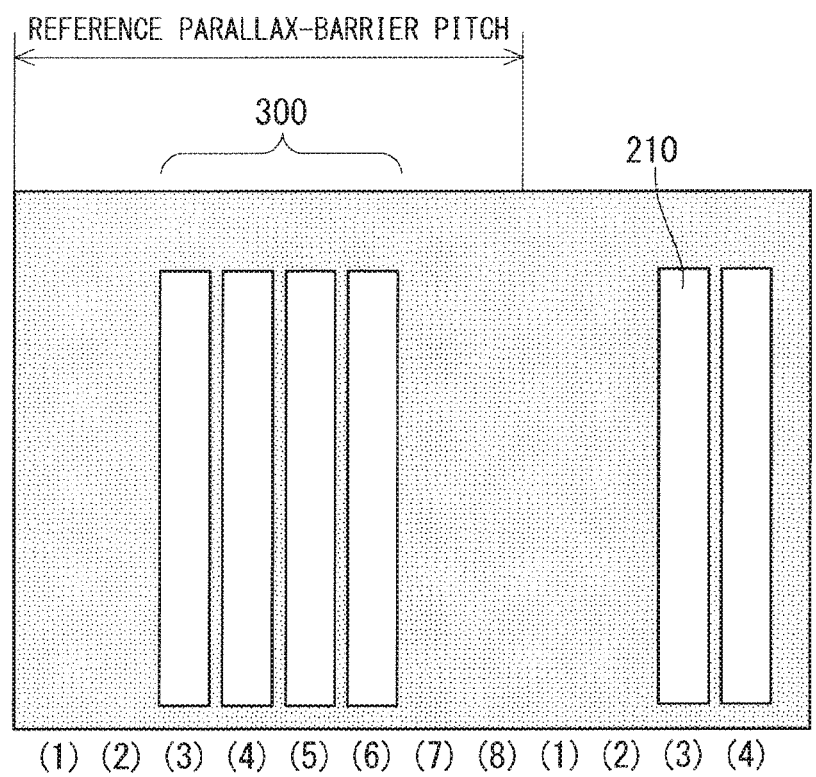
Figure 6:
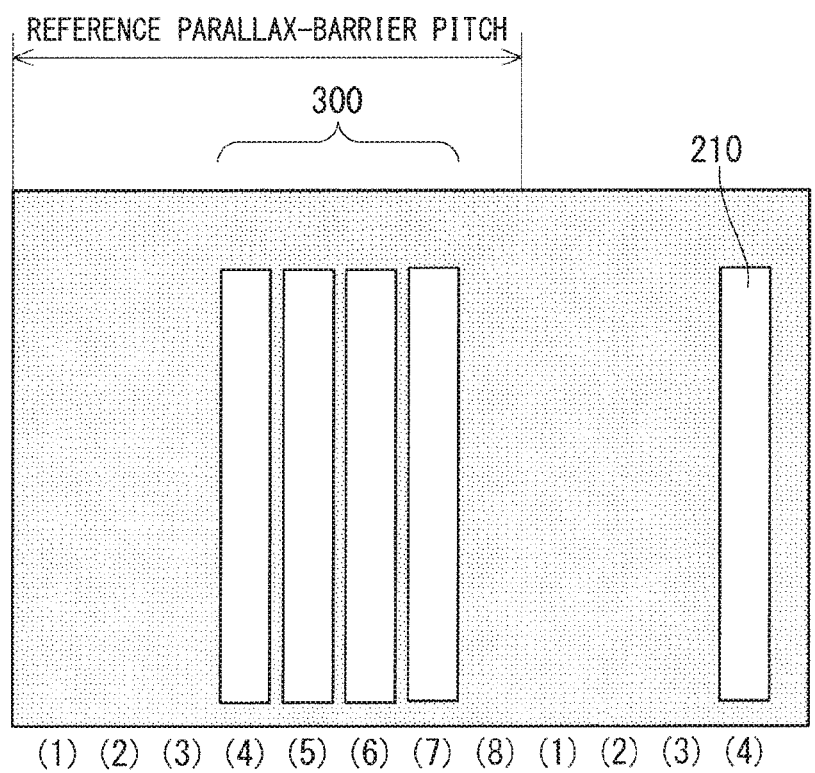
Figure 7:
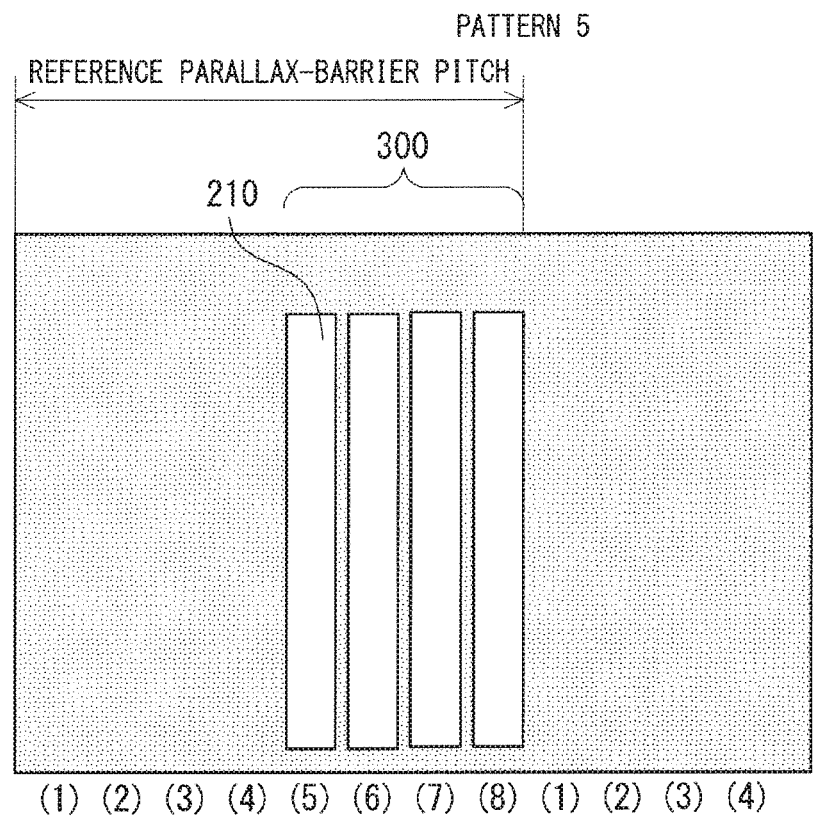
Figure 8:
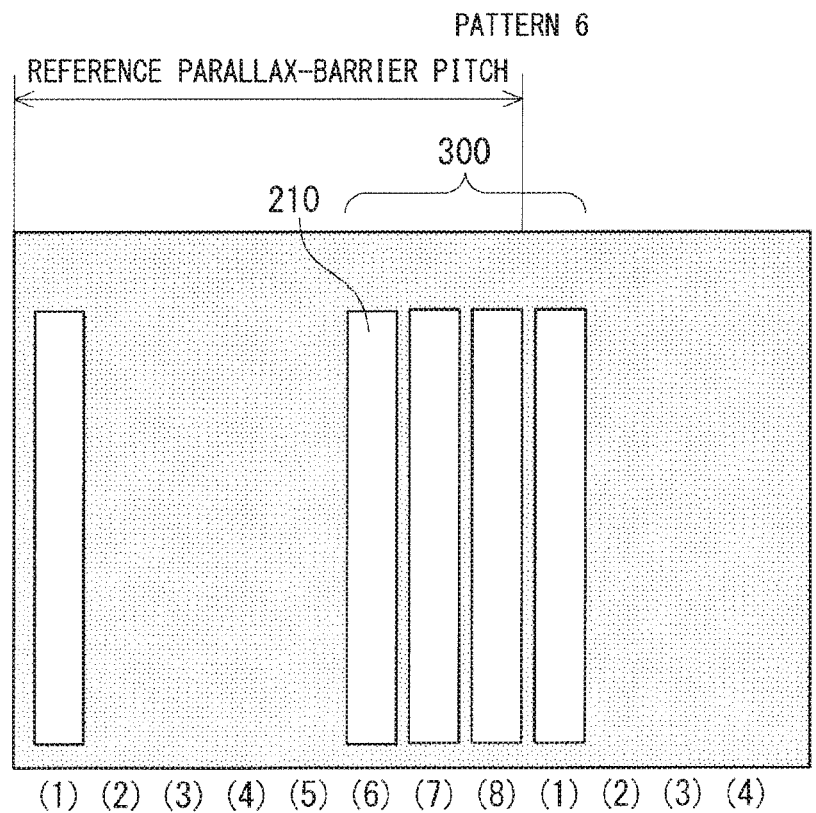
Figure 9:
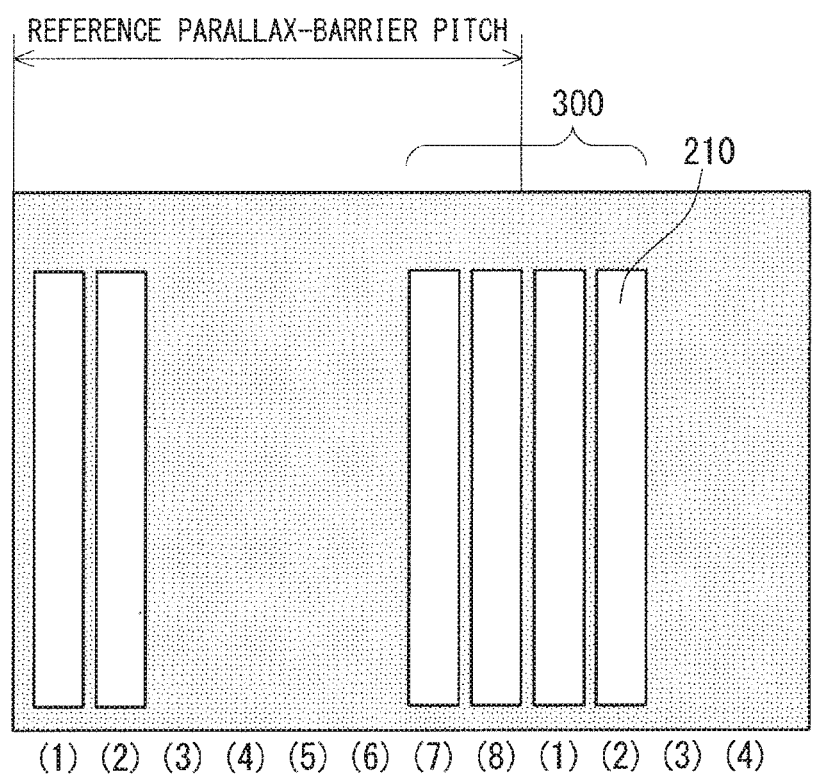
Figure 10:
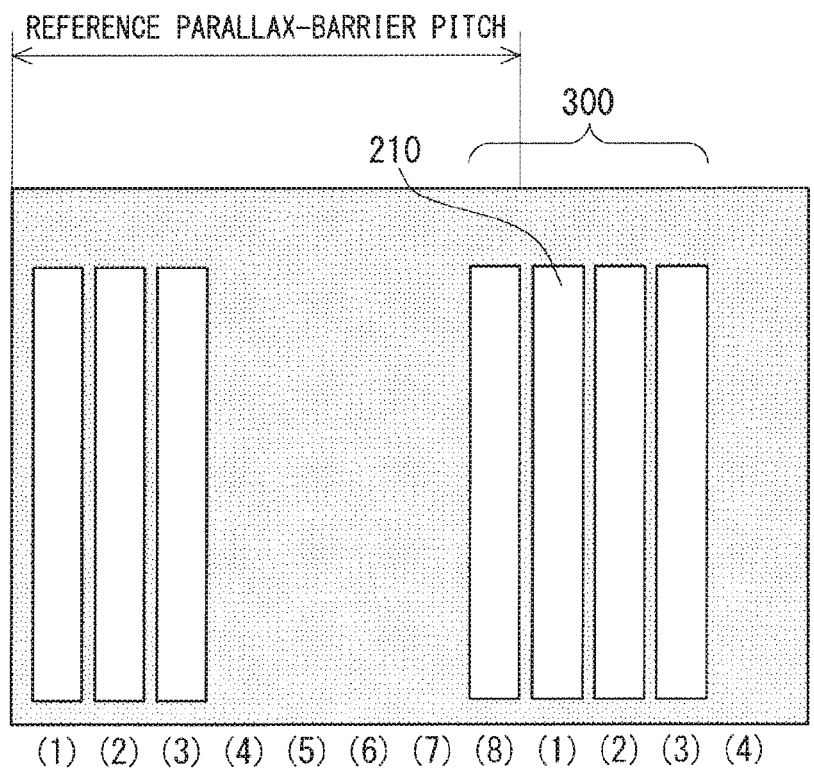

FIG. 2 is a cross-sectional view of a configuration example of the display panel 11 and the parallax barrier 21. Although the display panel 11 and the parallax barrier 21 are sequentially arranged from a backlight 19 toward the observer 41, the display panel 11 and the parallax barrier 21 except the backlight 19 may be arranged in reverse.

The display panel 11 includes sub-pixel transparent electrodes 12 disposed on a fourth transparent substrate 20, a liquid crystal layer 13, a counter transparent electrode 15 disposed on a third transparent substrate 14, a back-surface polarizer 16, an intermediate polarizer 17, and light-blocking walls 18.

The plurality of sub-pixel transparent electrodes 12 and the counter transparent electrode 15 are disposed between the intermediate polarizer 17 and the back-surface polarizer 16. Disposed between the plurality of sub-pixel transparent electrodes 12 and the counter transparent electrode 15 is the liquid crystal layer 13. The plurality of sub-pixel transparent electrodes 12 are sectioned, one-by-one, by the light-blocking walls 18.

In such a configuration, electric-field application, as necessary, between each sub-pixel transparent electrode 12 and the counter transparent electrode 15 changes the polarization of liquid crystals within the liquid crystal layer 13 for each sub-pixel transparent electrode 12. This enables the amount of light passing through the back-surface polarizer 16, the liquid crystal layer 13, and the intermediate polarizer 17 to be regulated in each of a plurality of sub-pixels 110, 111, 112, 113, and 114 corresponding, one-to-one, to the plurality of sub-pixel transparent electrodes 12.

Some sub-pixels 110, 112, and 114 among the plurality of sub-pixels 110, 111, 112, 113, and 114 are sub-pixels for a left image to be recognized by the left eye of the observer 41, and the other sub-pixels 111 and 113 are sub-pixels for a right image to be recognized by the right eye of the observer 41. A sub-pixel pair 31 that is a pair of the left-image sub-pixel 111 and the right-image sub-pixel 112, and a sub-pixel pair 32 that is a pair of the left-eye sub-pixel 113 and the right-eye sub-pixel 114 each constitute a single picture element.

The parallax barrier 21 includes a first transparent substrate 22, first transparent electrodes 23, a liquid crystal layer 24, a second transparent electrode 25, a second transparent substrate 26, and a display-surface polarizer 27. The plurality of first transparent electrodes 23 and the second transparent electrode 25 are disposed between the first transparent substrate 22 and the second transparent substrate 26. Disposed between the plurality of first transparent electrodes 23 and the second transparent electrode 25 is the liquid crystal layer 24. The display-surface polarizer 27 is disposed on a surface of the first transparent substrate 22, the surface being remote from the liquid crystal layer 24. The intermediate polarizer 17 is disposed on a surface of the second transparent substrate 26, the surface remote from the liquid crystal layer 24. Like the display panel 11, such a configuration enables the amount of light passing through portions of the liquid crystal layer 24 corresponding, one-to-one, to the plurality of first transparent electrodes 23 to be regulated.

According to the configuration in FIG. 2, a plurality of sub-openings (a state in which light passes through a light shutter is referred to as an opening) switchable between a light transmissive state and a light blocking state with respect to light from the display panel 11 are arranged in the parallax barrier 21, the sub-opening being shutters corresponding to the plurality of first transparent electrodes 23. In the parallax barrier 21, ranges corresponding to the respective sub-pixel pairs 31 and 32 of the display panel 11 are each referred to as a reference parallax-barrier pitch. A single reference parallax-barrier pitch includes the plurality of sub-openings (the plurality of first transparent electrodes 23) each having a sub-opening pitch. A single reference parallax-barrier pitch, although having eight sub-openings in the first preferred embodiment, may have any number of sub-openings.

The display apparatus according to the first preferred embodiment uses a parallax barrier pattern for selectively switching the plurality of sub-openings to a light transmissive state in stereoscopic display (3D display).

FIGS. 3 to 10 are diagrams illustrating eight different parallax barrier patterns for the sub-openings (barrier openings). Each parallax barrier pattern is mostly configured such that four adjacent sub-openings 210 switch to a light transmissive state to constitute a comprehensive opening 300, and four adjacent sub-openings 210 between two adjacent comprehensive openings 300 switch to a light blocking state.

A location suitable for the comprehensive opening 300 is selected. That is, one suitable parallax barrier pattern is selected from among the eight different parallax barrier patterns in FIGS. 3 to 10. Consequently, the right-image sub-pixel is recognized by the right eye of the observer 41, and the left-image sub-pixel, by the left eye of the same. At this stage, the display panel 11 displays the right and left images which are somewhat different from each other. This allows the observer 41 to see a stereoscopic image.

It is noted that a controller including the barrier-position calculator 5 and the barrier driver 6 in FIG. 1, which is not shown, determines a parallax barrier pattern on the basis of the position predicted by the observer-position predictor, and then drives the parallax barrier 21 on the basis of the parallax barrier pattern. For instance, when the observer 41 moves rightward in FIG. 2, the controller moves a comprehensive opening, consisting of four sub-openings, rightward by a single sub-opening (a single first transparent electrode 23). This allows the observer 41 to see a stereoscopic image even after the observer 41 moves.

Figure 11:
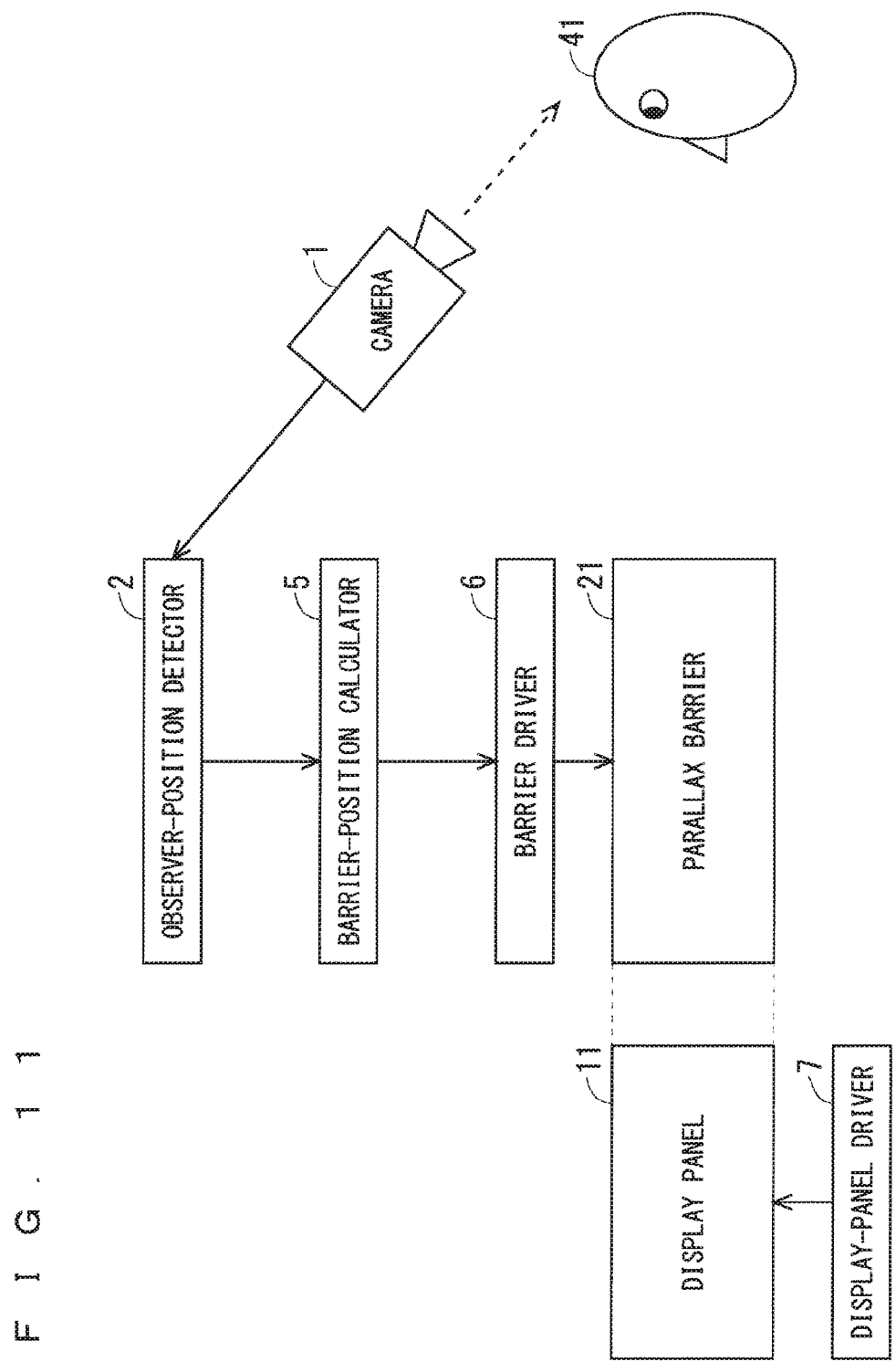
FIG. 11 is a block diagram illustrating a configuration of a related display apparatus.

FIG. 11 is a block diagram illustrating a configuration of a display apparatus relating to the display apparatus according to the first preferred embodiment. The related display apparatus basically includes the same components as the display apparatus (FIG. 1) according to the first preferred embodiment with the exception that the observer-position predictor 4 and the temperature sensor 3 are not included. The barrier-position calculator 5 of the related display apparatus calculates an optimal barrier stripe pattern not on the basis of the position of the observer predicted by the observer-position predictor 4, but on the basis of the position of the observer calculated by the observer-position detector 2.

<Operation>

The following describes the operation of the related display apparatus before describing the display apparatus according to the first preferred embodiment.

Figure 12:
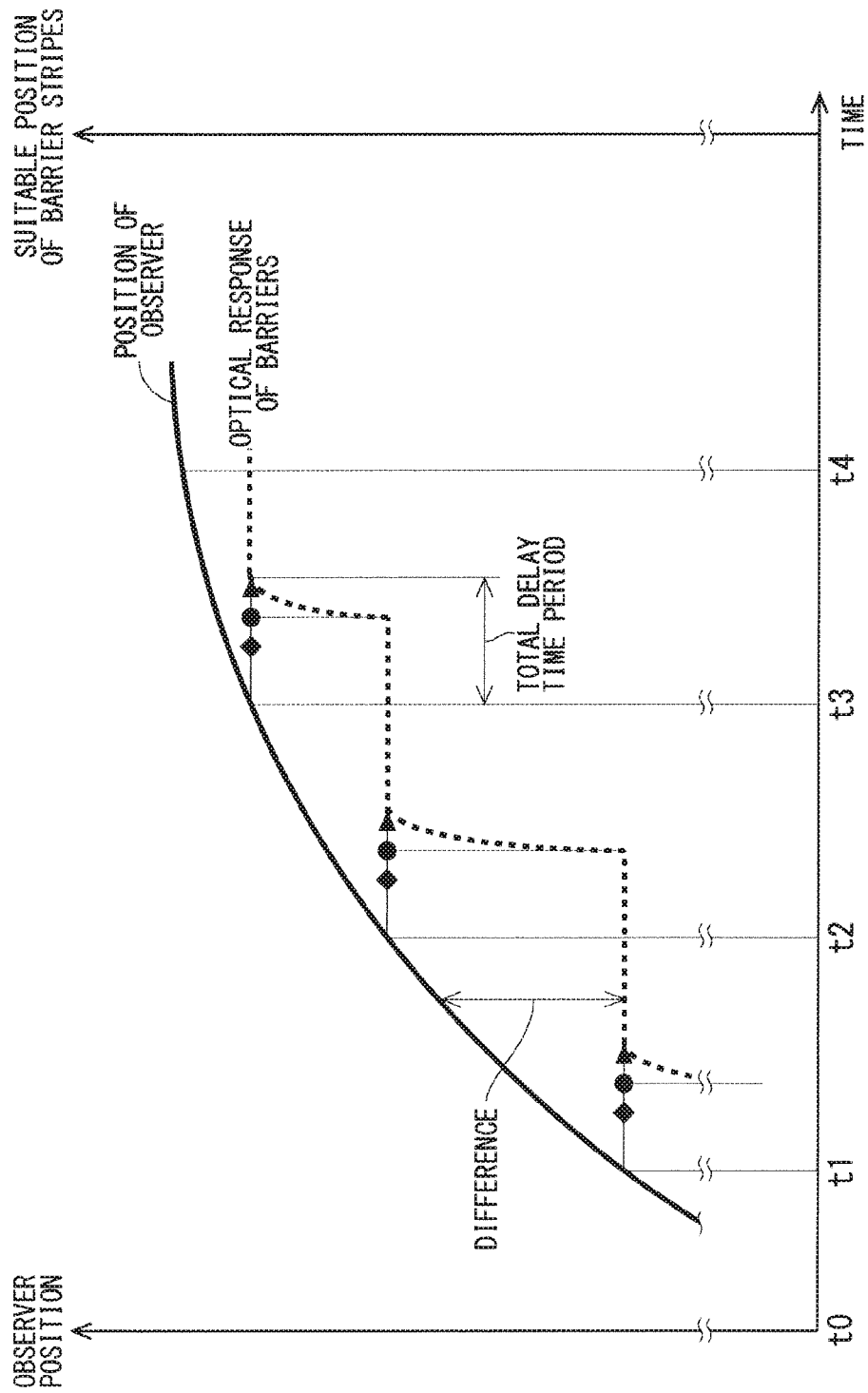
FIG. 12 is a diagram illustrating the operation of the related display apparatus.

FIG. 12 is a diagram illustrating the operation of the related display apparatus. A longitudinal axis in FIG. 12 indicates one-dimensional positions of the observer. Further, quadrangular marks in FIG. 12 denote times at which the observer-position detector 2 finish calculating the positions of the observer. Still further, circular marks in FIG. 12 denote times at which the barrier-position calculator 5 finishes determining parallax barrier patterns. Still further, triangular marks in FIG. 12 denote finish times of the switching of the parallax barrier 21 to a light transmissive state or a light blocking state.

As such, a time period between each observer position and each quadrangular mark (hereinafter referred to as a first time period) is roughly equal to a time period necessary for the observer-position detector 2 to calculate the observer position. Further, a time period between each quadrangular mark and each circular mark (hereinafter referred to as a second time period) is roughly equal to a time period necessary for the barrier-position calculator 5 to determine the parallax barrier pattern. Still further, a time period between each circular mark and each triangular mark (hereinafter referred to as a third time period) is roughly equal to a time period during which barriers of the parallax barrier 21 respond, i.e., to a time period during which the liquid crystals respond. Hereinafter, the total time period of the first, second, and third time periods is also referred to as a total delay time period.

As illustrated in FIG. 12, the observer-position detector 2 finishes, at the time denoted by the quadrangular mark, calculating the observer position from the observer's image captured at each of times t0, t1, t2, . . . , a time at which the observer's image is captured. Further, the barrier-position calculator 5 finishes determining the parallax barrier pattern at the time denoted by the circular mark. Still further, the parallax barrier 21 finishes the switching at the time denoted by the triangular mark. In the related display apparatus, such a delay as described above produces a relatively large difference between a suitable position of barrier stripes (suitable position of a comprehensive opening) of the parallax barrier 21 indicated by a dotted line in FIG. 12 and the observer position. It is noted that this difference is generally a degree obtained by multiplying an image-capturing-time interval by an observer speed.

The display apparatus according to the first preferred embodiment, in contrast to the related display apparatus, reduces this difference, the details of which will be described below.

Figure 13:
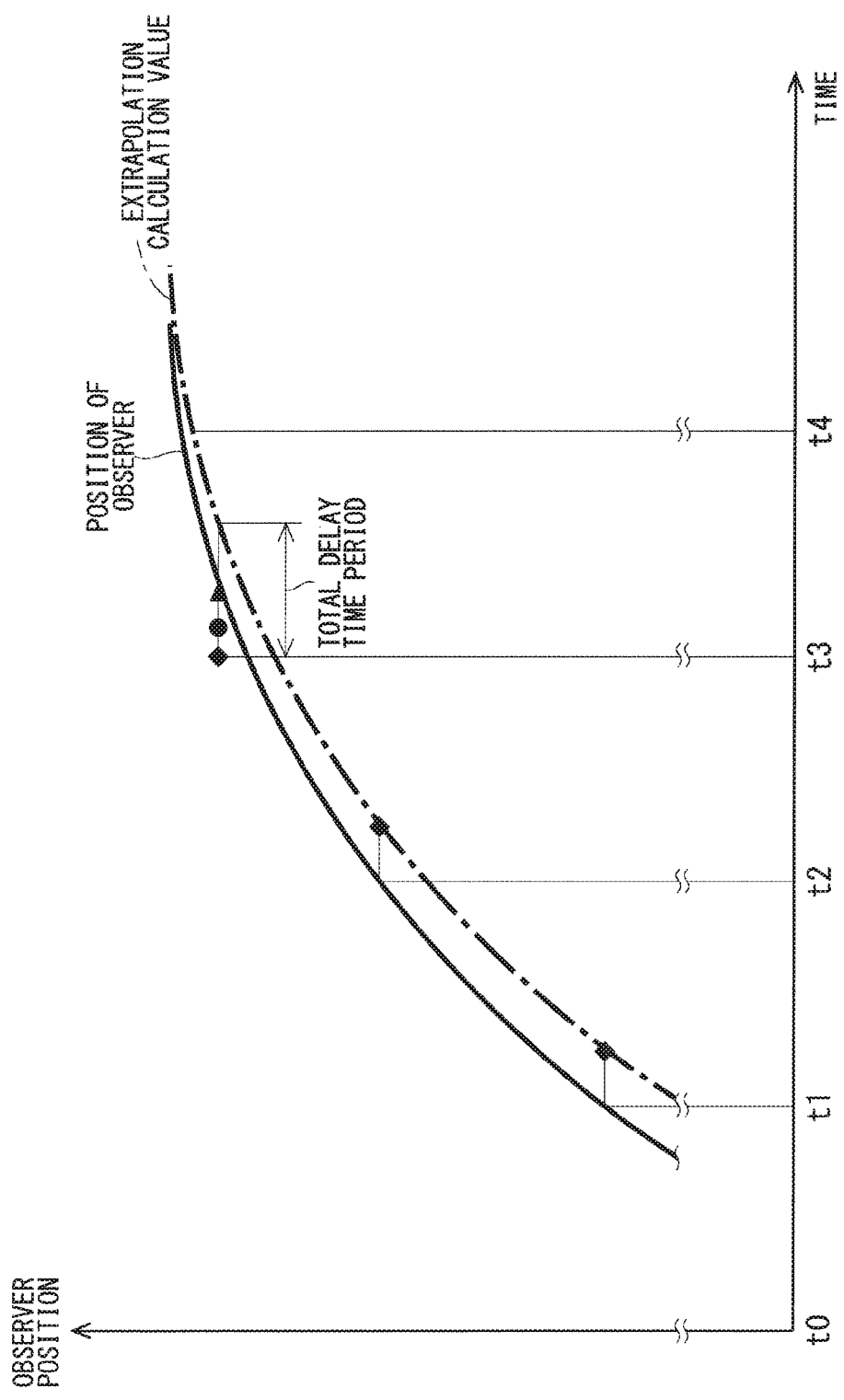
FIGS. 13 to 15 are diagrams illustrating the operation of the display apparatus according to the first preferred embodiment.

FIG. 13 is a diagram illustrating the operation of the display apparatus according to the first preferred embodiment. As illustrated in FIG. 13, the observer-position predictor 4 determines an expression for an extrapolation calculation value using the plurality of positions detected by the observer-position detector 2 in the past. The camera 1 typically has an image-capturing frequency that is sufficiently short with respect to observer movements. For this reason, the observer-position predictor 4 is capable of determining, as an expression for an extrapolation calculation value, a first-degree expression (uniform motion) relating to an observer position and a time by the use of two or more positions in the past, or a second-degree expression (equipotent motion) relating to an observer position and a time by the use of three or more positions in the past.

Any kind of expression may be used to obtain an extrapolation calculation value. For instance, when the number of positions detected by the observer-position detector 2 in the past is equal to or greater than n, the observer-position predictor 4 may determine an expression of a degree of (n−1) relating to the position of the observer and a time as an expression for an extrapolation calculation value, where n is an integer equal to or greater than two. Further, the observer-position predictor 4 may determine, for instance, an irrational function expression or an exponential function expression as an expression for an extrapolation calculation value.

Still further, for low-accuracy position detection such as noise in a plurality of past positions, the observer-position predictor 4 may apply a least squares method to a position detected at a time going backward from the aforementioned past time. Such a configuration reduces noise effects.

The following description provides an example in which the observer-position predictor 4 determines a second-degree expression relating to an observer position and a time by the use of three or more positions in the past as an expression for an extrapolation calculation value.

As illustrated in FIG. 13, the curve of a chain line formed by expressions for extrapolation calculation values is ideally formed by delaying the curve of a continuous line indicative of observer positions by a time period necessary for the observer-position detector 2 to calculate the observer position.

Here, let a current time be a time t3 in FIG. 13. Since the camera 1 has just started to capture an image at the time t3, the observer-position predictor 4 cannot obtain the observer position at the time t3 from the observer-position detector 2. Thus, the observer-position predictor 4 determines the expressions for the extrapolation calculation values using positions x2, x1, x0, . . . at past times t2, t1, t0, . . . . For instance, the observer-position predictor 4 respectively substitutes, in a formula (1), x0, x1, and x2 for x indicative of positions, and t0, t1, and t2 for t indicative of times, when an expression for an extrapolation calculation value corresponding to an equipotent motion to be determined is indicated through the following formula (1):

$$x = a \times t^2 + b \times t + c \qquad (1).$$

Calculating three unknowns: a, b, and c, from the three expressions obtained by the above substitutions determines the expressions for the extrapolation calculation values. It is noted that the use of values starting from the time t0 as the time t achieves easy calculation.

The observer-position predictor 4 determines an observer position at a future time going forward from the current time, i.e., the time t3, by the aforementioned total delay time period by using an expression for an extrapolation calculation value. Alternatively, the observer-position predictor 4 determines an observer position at a future time going forward from the current time, i.e., the time t3, by the aforementioned second and third time periods by using an expression for an extrapolation calculation value. Since the extrapolation calculation value is delayed by the first time period, the observer position at the time after the second and third time periods from the time t3 on the curve of the chain line, formed by the expressions for the extrapolation calculation values, is about the same as an observer position at the same time on the continuous line.

The observer positions are typically detected at regular intervals of about 60 Hz. Thus, in the related display apparatus, the parallax barrier 21 switches between the light transmissive state and the light blocking state in a temporally discrete matter. Meanwhile, the observer continuously moves. Such a difference in motion between the observer and the parallax barrier 21 also causes the difference between the suitable position of the barrier stripes of the parallax barrier 21 and the observer position in the related display apparatus. Accordingly, the related display apparatus includes a high-speed-signal-calculation IC, high-speed-response liquid crystals, or other components, to thus minimize a delay from the camera 1 to the parallax barrier 21. The high-speed-signal-calculation IC or the high-speed-response liquid crystals unfortunately increases costs.

Figure 14:
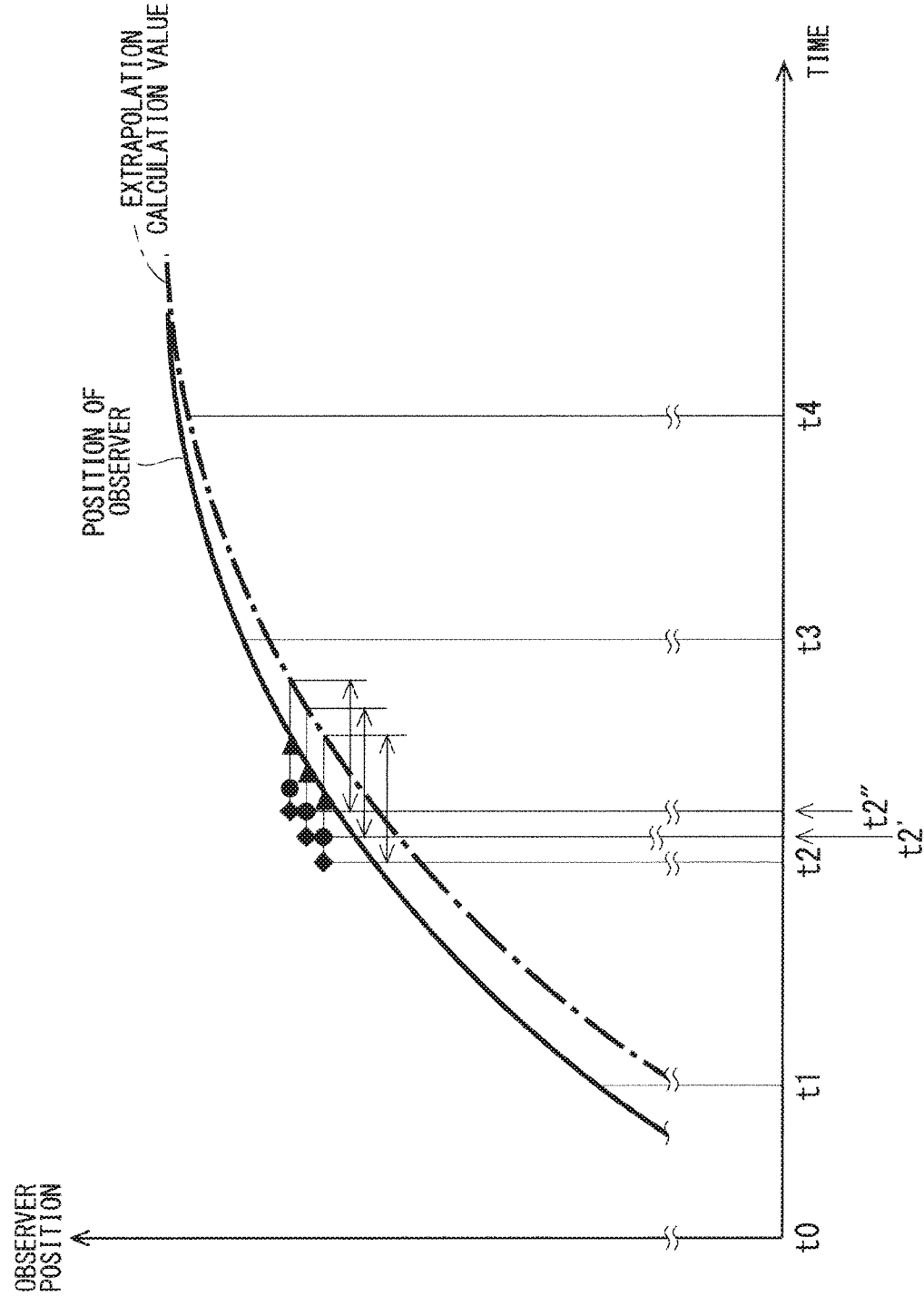

FIG. 14 is a diagram illustrating the operation of the display apparatus according to the first preferred embodiment capable of solving this problem.

In FIG. 14, the observer-position predictor 4 predicts an observer position at any given time between the times t0, t1, t2, t3 . . . , at which the camera 1 captures the observer images, without limiting to these times. To be specific, the observer-position predictor 4 predicts the observer positions at time intervals shorter than the image-capturing time in the camera 1 on or after the time t2; thus, the prediction frequency of the observer-position predictor 4 is higher than the detection frequency of the observer-position detector 2. Once the observer-position predictor 4 determines the coefficient of the formula (1), increasing the frequency of prediction through the formula (1) is easy; thus, the prediction frequency considerably rises. Each time the observer-position predictor 4 predicts an observer position, the barrier-position calculator 5 and the barrier driver 6 drive and control the parallax barrier 21 on the basis of the observer position as predicted.

Such a configuration in the first preferred embodiment reduces, as illustrated in FIG. 14, the difference between the suitable position of the barrier stripes and the observer position, the difference occurring in low-frequency image capturing (an instance in FIG. 12).

Liquid crystals take a long time period for response under low temperature. That is, in the total delay time period, a time period for response of the liquid crystals within the parallax barrier 21 (the third time period) greatly varies according to temperatures. Hence, the related display apparatus needs to take some measures not to display a stereoscopic image, such as turning the parallax barrier 21 into a light transmissive state in whole for normal two-dimensional display.

On the other hand, the observer-position predictor 4 in the first preferred embodiment changes a time period between the current time and the future time, which is a time indicative of an observer position to be predicted, on the basis of the temperature of the parallax barrier 21 as detected by the temperature sensor 3. For instance, the lower the temperature has been detected by the temperature sensor 3, the more the observer-position predictor 4 lengthens the time period between the current time and the future time. With such a configuration, the display apparatus in the first preferred embodiment substantially less affects the time period for response of the liquid crystals than the related display apparatus even if the liquid crystals take a significantly long time period for response due to low-temperature surroundings and a low-temperature parallax barrier 21. This enables stereoscopic display under relatively low temperature.

A processing time period of the camera 1 is subject to change due to a factor, such as external light. The display apparatus accordingly may include an illumination-intensity sensor, which is not shown. Further, the observer-position predictor 4 may obtain, from the illumination-intensity sensor, information indicative of the illumination intensity of the display apparatus illuminated by light from outside the display apparatus, and then may change, on the basis of the information, the time period between the current time and the future time, which is a time indicative of an observer position to be predicted. For instance, the observer-position predictor 4 lengthens the time period between the current time and the future time along with an increase in illumination intensity. Such a configuration achieves a display apparatus resistant to an effect, such as external light.

In the first preferred embodiment, the position of the observer is a two-dimensional position including horizontal and perpendicular positions, as earlier mentioned. Thus, the aforementioned prediction is performed with respect to each of the horizontal and perpendicular positions.

The barrier-position calculator 5 calculates a suitable parallax barrier pattern on the basis of information about the observer position (left or right as well as distance) predicted by the observer-position predictor 4. The barrier-position calculator 5 calculates a position of the parallax barrier 21 in each site on the screen from a relationship between the display panel 11 and the parallax barrier 21 spaced from the display panel 11 at a certain interval, in such a manner that a predetermined right sub-pixel reaches the observer's right eye and a predetermined left sub-pixel reaches the observer's left eye.

The barrier-position calculator 5 ideally moves the comprehensive opening 300 in FIGS. 3 to 10 leftward or rightward little by little when the observer gradually moves. However, the barrier-position calculator 5 discretely moves the comprehensive opening 300 under a pattern limitation relating to the number of first transparent electrodes 23 within a single reference parallax-barrier pitch (eight different patterns in the first preferred embodiment), because the positions of the first transparent electrodes 23 and the number of first transparent electrodes 23 are fixed. For instance, when a suitable position of the comprehensive opening 300 with respect to an observer position as predicted is calculated to be located between a pattern (3) in FIG. 5 and a pattern (4) in FIG. 6 among the parallax barrier patterns, the barrier-position calculator 5 chooses either pattern that is closer to the predicted observer position.

Figure 15:
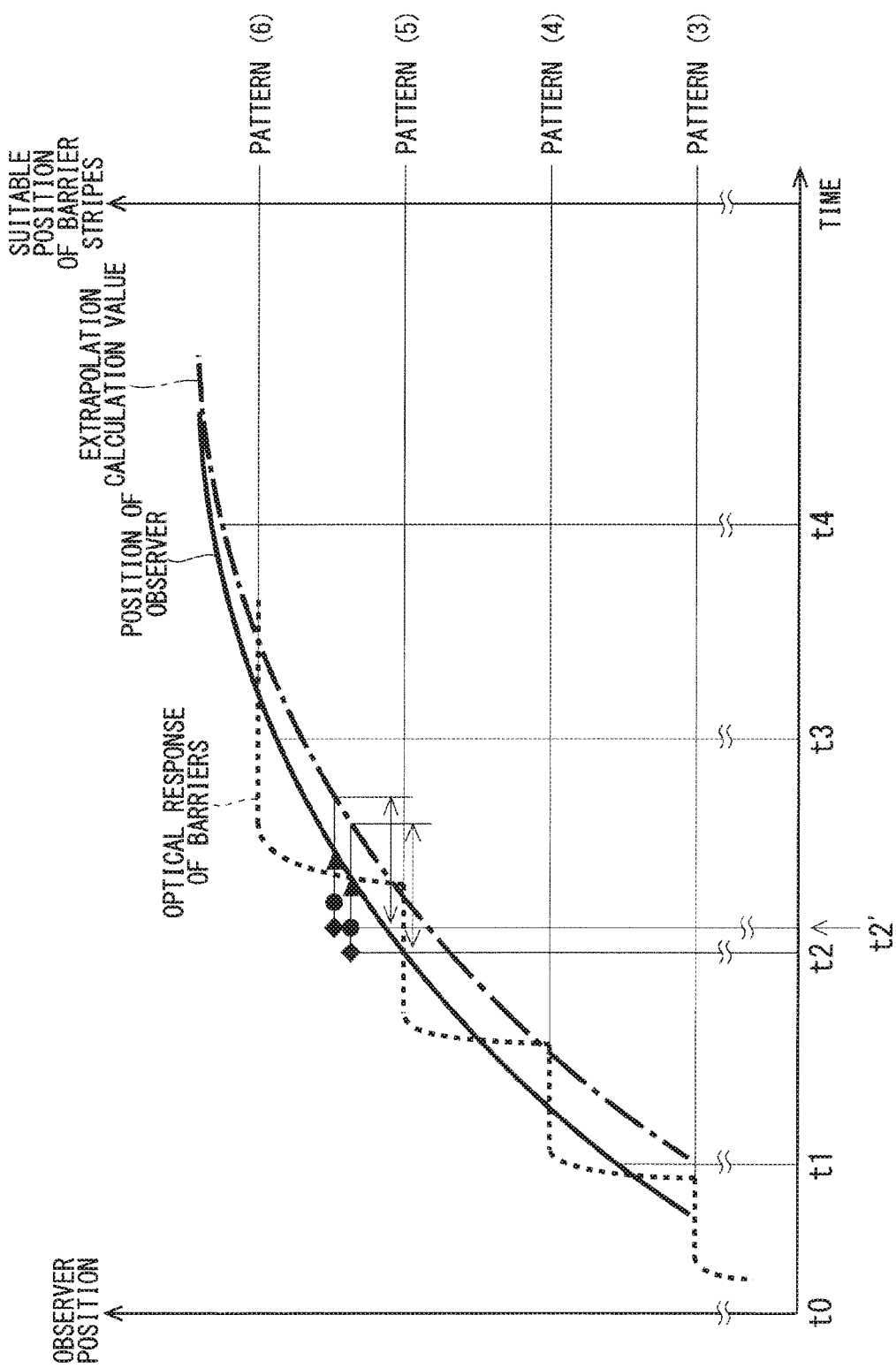

With reference to FIG. 15, the following describes the operation of a configuration with practically limited parallax barrier patterns. When the time t2 is a current time, the observer-position predictor 4 predicts a position of the observer by applying a future time coming after the time t2 to an expression for an extrapolation calculation value, as earlier described. A suitable parallax barrier pattern at this stage is somewhat close to a pattern (6), but is still closer to a pattern (5). Accordingly, the barrier-position calculator 5 chooses the pattern (5). A cycle is shorter than an image-capturing period. Similar calculation at a time t2' corresponding to the next cycle provides a suitable parallax barrier pattern that is slightly closer to the pattern (6) than to the pattern (5). Accordingly, the barrier-position calculator 5 chooses the pattern (6). Consequently, the pattern of the parallax barrier 21 shifts from the pattern (5) to the pattern (6). Doing so enables a suitable position for an optical response of the barriers to be the closest to the position of the observer as predicted, thereby enhancing the display quality of a stereoscopic image.

Figure 16:
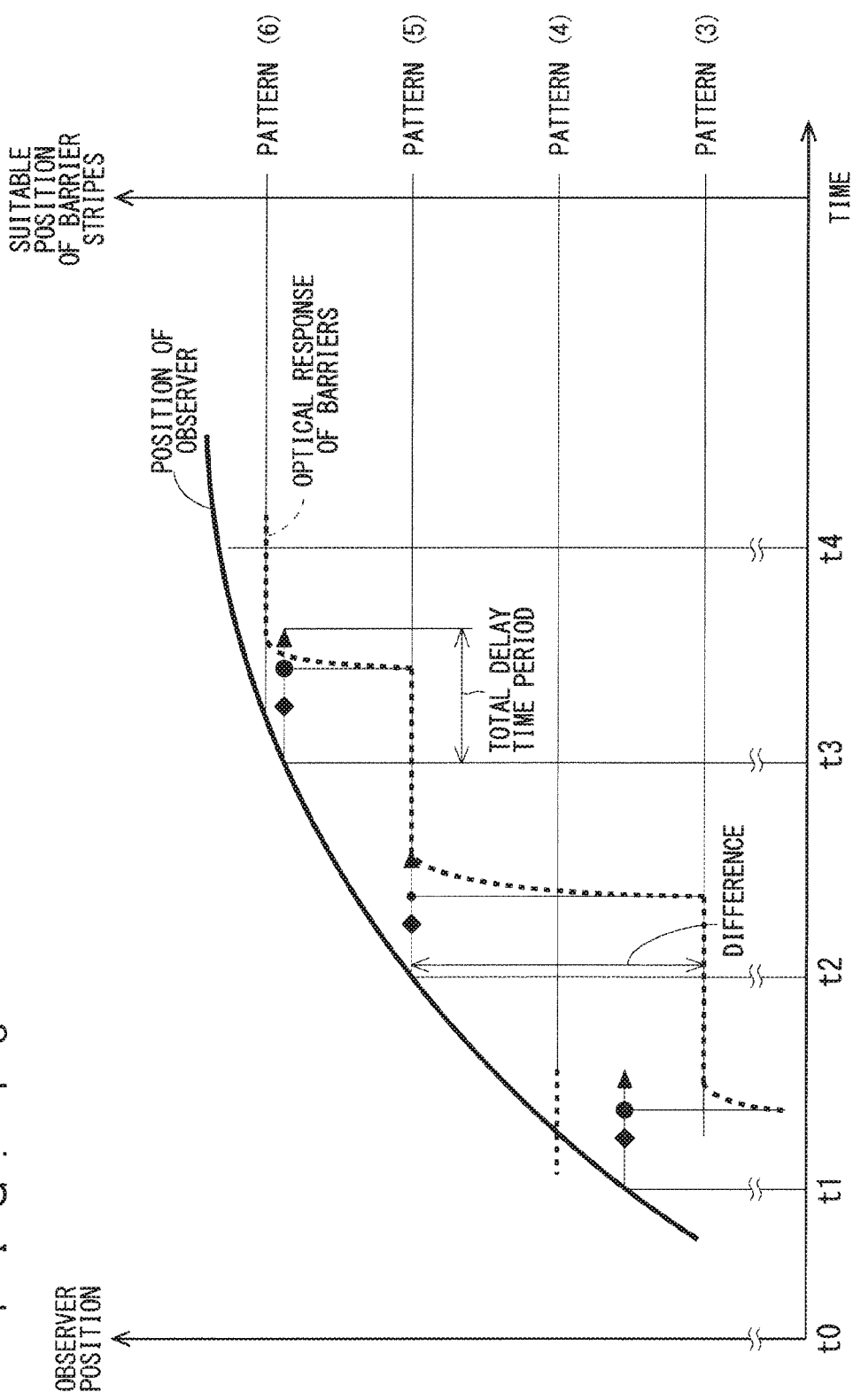
FIG. 16 is a diagram illustrating the operation of the related display apparatus.

FIG. 16 illustrates operation that reflects discrete parallax barrier patterns to the operation of the related display apparatus illustrated in FIG. 12. The operation of the display apparatus in FIG. 15 according to the first preferred embodiment reduces a difference between a suitable position of the barrier stripes of the parallax barrier 21 and an observer position when compared to the operation of the related display apparatus in FIG. 16.

<Gist of First Preferred Embodiment>

The display apparatus according to the first preferred embodiment predicts a position of an observer at a time coming after past times at which a plurality of positions have been detected on the basis of the plurality of positions detected by the barrier-position calculator 5 at the past times, determines a parallax barrier pattern on the basis of the predicted position, and drives the parallax barrier 21 on the basis of the parallax barrier pattern. Such a configuration reduces a difference between a suitable position of the barrier stripes of the parallax barrier 21 and the position of the observer. This enhances the display quality of a stereoscopic image.

<Modification>

In the first preferred embodiment, it is described that the observer-position detector 2 detects a position of an observer from an image captured by the camera 1. The observer-position detector 2 may be configured in any manner, for instance, the observer-position detector 2 may detect the position of the observer from information obtained from an infrared sensor or other systems.

The first preferred embodiment describes that the display panel 11 is a liquid crystal panel. The display panel 11 may be any kind of panel; for instance, the display panel 11 may be an organic electroluminescence (EL) display panel.

The parallax barrier 21, although having eight sub-openings in the first preferred embodiment, may have any number of sub-openings.

The observer-position detector, the observer-position predictor, and the barrier-position calculator, although configured by a microcomputer in the first preferred embodiment, may be configured by a logic circuit formed in a field-programmable gate array (FPGA) for instance.

It is also noted that in the present invention, the individual embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display apparatus comprising:
   a display panel;
   a parallax barrier in which a plurality of light shutters switchable between a light transmissive state and a light blocking state with respect to light from the display panel are arranged;
   a detector configured to detect a position of an observer;
   a predictor configured to predict, on the basis of a plurality of positions detected by the detector at past times, the position of the observer at a time coming after the past times, at which the plurality of positions have been detected;
   a controller configured to control selective switching of the plurality of light shutters to the light transmissive state on the basis of the position predicted by the predictor; and
   a camera configured to capture an image of the observer and output the image as captured to the detector, wherein
   the time coming after the past times is a future time coming after a current time that is a start time for capturing the image of the observer, and
   a time difference between the current time and the time coming after the past times corresponds to:
      a total time of a time period necessary for the detector to detect the position of the observer on the basis of the image,
      a time period necessary for determining a switching pattern of the parallax barrier, and
      a time period during which the parallax barrier responds.

2. The display apparatus according to claim 1, wherein a prediction frequency of the predictor is higher than a detection frequency of the detector.

3. The display apparatus according to claim 1, wherein when the number of positions detected by the detector at the past times is equal to or greater than n, the predictor is configured to predict the position of the observer at the time coming after the past times using an expression of a degree of (n−1) relating to the position of the observer and a time, where n is an integer equal to or greater than two.

4. The display apparatus according to claim 3, wherein n is two or three.

5. A display apparatus comprising:

a display panel;

a parallax barrier in which a plurality of light shutters switchable between a light transmissive state and a light blocking state with respect to light from the display panel are arranged;

a detector configured to detect a position of an observer;

a predictor configured to predict, on the basis of a plurality of positions detected by the detector at past times, the position of the observer at a time coming after the past times, at which the plurality of positions have been detected;

a controller configured to control selective switching of the plurality of light shutters to the light transmissive state on the basis of the position predicted by the predictor; and a camera configured to capture an image of the observer and output the image as captured to the detector, wherein the time coming after the past times is a future time coming after a current time that is a start time for capturing the image of the observer, and a time period between the current time and the future time is changed on the basis of a temperature of the parallax barrier.

6. A display apparatus comprising:

a display panel;

a parallax barrier in which a plurality of light shutters switchable between a light transmissive state and a light blocking state with respect to light from the display panel are arranged;

a detector configured to detect a position of an observer;

a predictor configured to predict, on the basis of a plurality of positions detected by the detector at past times, the position of the observer at a time coming after the past times, at which the plurality of positions have been detected;

a controller configured to control selective switching of the plurality of light shutters to the light transmissive state on the basis of the position predicted by the predictor; and a camera configured to capture an image of the observer and output the image as captured to the detector, wherein the time coming after the past times is a future time coming after a current time that is a start time for capturing the image of the observer, and a time period between the current time and the future time is changed on the basis of an illumination intensity of the display apparatus illuminated by light from outside the display apparatus.

* * * * *